United States Patent
Matsumoto et al.

(10) Patent No.: US 7,359,306 B2
(45) Date of Patent: Apr. 15, 2008

(54) HOLOGRAPHIC RECORDING MEDIUM

(75) Inventors: Kazuki Matsumoto, Kawasaki (JP); Katsutaro Ichihara, Yokohama (JP); Akiko Hirao, Chiba (JP); Hideyuki Nishizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 531 days.

(21) Appl. No.: 10/773,323

(22) Filed: Feb. 9, 2004

(65) Prior Publication Data

US 2004/0233831 A1 Nov. 25, 2004

(30) Foreign Application Priority Data

Mar. 18, 2003 (JP) ............... 2003-074121

(51) Int. Cl.
*G11B 7/00* (2006.01)

(52) U.S. Cl. ............... 369/103; 369/284; 369/285

(58) Field of Classification Search ............... 369/103, 369/284, 285; 428/64

See application file for complete search history.

(56) References Cited

U.S. PATENT DOCUMENTS

| | | | | |
|---|---|---|---|---|
| 5,576,084 A | * | 11/1996 | Kuroda | 428/64.1 |
| 5,592,461 A | * | 1/1997 | Tsujioka et al. | 369/126 |
| 5,917,798 A | | 6/1999 | Horimai et al. | |
| 7,002,891 B2 | * | 2/2006 | Horimai | 369/103 |
| 7,042,824 B2 | * | 5/2006 | Tsukamoto | 369/59.22 |
| 2006/0109774 A1 | * | 5/2006 | Horimai et al. | 369/275.1 |

FOREIGN PATENT DOCUMENTS

| | | |
|---|---|---|
| JP | 58-95375 | 6/1983 |
| JP | 61-105506 | 5/1986 |
| JP | 2-19092 | 1/1990 |
| JP | 2002-123949 | 4/2002 |

OTHER PUBLICATIONS

U.S. Appl. No. 10/775,060, filed Feb. 11, 2004, Hirao et al.
U.S. Appl. No. 10/796,342, filed Mar. 10, 2004, Hirao et al.
U.S. Appl. No. 10/773,323, filed Feb. 9, 2004, Matsumoto et al.

* cited by examiner

*Primary Examiner*—Wayne Young
*Assistant Examiner*—LaTanya Bibbins
(74) *Attorney, Agent, or Firm*—Oblon, Spivak, McClelland, Maier & Neustadt, P.C.

(57) ABSTRACT

Provided is a holographic recording medium including a recording layer in which information is to be holographically recorded, and a light-shielding layer which faces a main surface of the recording layer. The transmittance of the light-shielding layer for a recording light is increased on increasing intensity of the recording light. Alternatively, the light-shielding layer selectively transmits the recording light.

10 Claims, 3 Drawing Sheets

HOLOGRAPHIC RECORDING MEDIUM

CROSS-REFERENCE TO RELATED APPLICATIONS

This application is based upon and claims the benefit of priority from the prior Japanese Patent Application No. 2003-074121, filed Mar. 18, 2003, the entire contents of which are incorporated herein by reference.

BACKGROUND OF THE INVENTION

1. Field of the Invention

The present invention relates to a recording medium and, particularly, to a holographic recording medium.

2. Description of the Related Art

Optical recording media can record large-volume information such as high-density image data. Examples of optical recording media already put into practical use are rewritable optical recording media such as a magneto-optical disk and phase-change optical disk, and WORM (Write-Once Read-Many) optical recording media such as CD-R.

Demands for increasing the capacity of these optical recording media are more and more increasing. Therefore, a holographic recording medium capable of three-dimensionally recording information has attracted attention in recent years.

According to the holographic recording technique, information is generally recorded by superposing information light having a two-dimensional intensity distribution upon reference light having a substantially constant intensity inside a photosensitive recording layer, and producing an optical characteristic distribution inside the recording layer by using an interference pattern that the lights forms. Also, written information is read out by irradiating the recording layer only with the reference light in the same arrangement as in recording. This reference light is diffracted by the optical characteristic distribution formed inside the recording layer, and output from the recording layer as reproduced light having an intensity distribution corresponding to the information light.

In this technique, an optical characteristic distribution is three-dimensionally formed in the recording layer. This makes it possible to partially overlap a region in which information is written by certain information light, and a region in which information is written by another information light each other. That is, multiple recording can be performed. Especially when digital volume holography is used, original information can be reproduced with high fidelity even if the signal-to-noise ratio (S/N ratio) is more or less low. Accordingly, the recording capacity of an optical recording medium can be greatly increased.

To perform multiple recording on the holographic recording medium, the intensity of an optical characteristic change produced in the recording layer when it is irradiated with information light and reference light is ideally proportional to the number of photons of interference light formed by interference between the information light and reference light. That is, this recording layer is desirably capable of photon mode recording.

Unfortunately, a recording layer capable of photon mode recording may change the optical characteristics even with very weak light, e.g., light from a fluorescent lamp in a room. This sometimes makes it impossible to obtain a long shelf life if the recording layer is exposed to ambient light, e.g., room illumination light before recording.

A long shelf life can be realized by encasing each optical recording medium in a light-shielding cartridge. However, the use of the cartridge significantly deteriorates the space-saving property and portability.

BRIEF SUMMARY OF THE INVENTION

According to a first aspect of the present invention, there is provided a holographic recording medium comprising a recording layer in which information is to be holographically recorded, and a light-shielding layer which faces a main surface of the recording layer and whose transmittance for a recording light is increased on increasing intensity of the recording light.

According to a second aspect of the present invention, there is provided a holographic recording medium comprising a recording layer in which information is to be holographically recorded, and a light-shielding layer which faces a main surface of the recording layer and selectively transmits a recording light.

According to a third aspect of the present invention, there is provided a holographic recording medium comprising a recording layer in which information is to be holographically recorded, and a light-shielding layer which faces a main surface of the recording layer, transmittance of the light-shielding layer for a recording light being increased on increasing intensity of the recording light, or the light-shielding layer selectively transmitting the recording light.

DETAILED DESCRIPTION OF THE INVENTION

Figure 1:
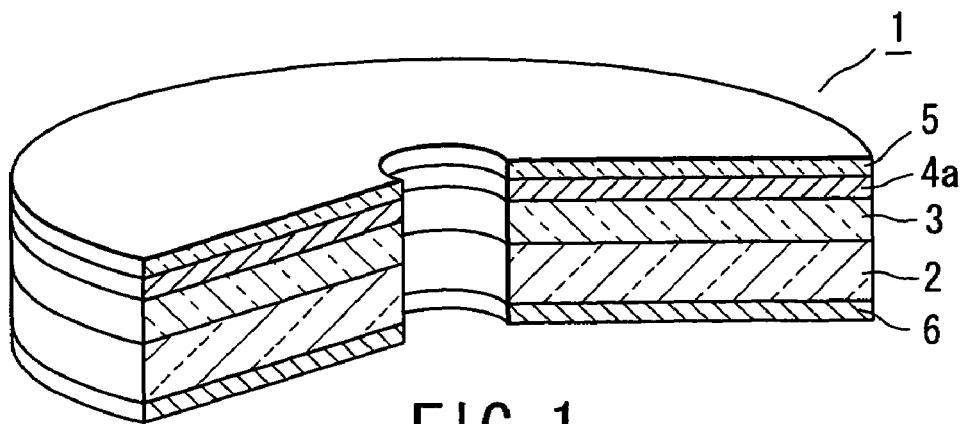
FIG. 1 is a partially cutaway perspective view schematically showing a holographic recording medium according to the first embodiment of the present invention.

Embodiments of the present invention will be described in detail below with reference to the accompanying drawing. The same reference numerals in the drawing denote components having the same functions or similar functions, and a repetitive explanation thereof will be omitted.

FIG. 1 is a partially cutaway perspective view schematically showing a holographic recording medium according to the first embodiment of the present invention.

An optical recording medium 1 shown in FIG. 1 includes a transparent substrate 2. On one main surface of the substrate 2, a recording layer 3, light-shielding layer 4a, and protective layer 5 are stacked in this order. On the other main surface of the substrate 2, a reflecting layer 6 is disposed. That is, the optical recording medium 1 is a reflection type optical recording medium.

The transparent substrate 2 plays a role to locate the recording layer 3 apart from the reflecting layer 6. Accordingly, the transparent substrate 2 between the recording layer 3 and reflecting layer 6 is not necessary, provided that the recording layer 3 and reflecting layer 6 can be spaced apart from each other. For example, the transparent substrate 2 between the recording layer 3 and the reflecting layer 6 is unnecessary where a transparent first substrate having a recording layer 3 on a surface thereof and a second substrate having a reflecting layer 6 on a surface thereof are placed such that the recording layer 3 and reflecting layer 6 face each other with a predetermined spacing therebetween, and a light-shielding layer 4a is disposed on the light source side with the recording layer 3 interposed between the light-shielding layer 4a and reflecting layer 6. In this case, the light-shielding layer 4a can be disposed on the surface of the first substrate away from the recording layer. Alternatively, the light-shielding layer can be disposed between the first substrate and recording layer. The shape of the transparent substrate 2 is not particularly limited. For example, the transparent substrate 2 can take the shape of a disk as shown in FIG. 1, or the shape of a card or block. As the material of the transparent substrate 2, it is possible to use the same transparent material as generally used in optical recording media. Examples are glass and polycarbonate.

The recording layer 3 is a material in which information can be holographically recorded. That is, when irradiated with an mechanical wave having a predetermined wavelength, the recording layer 3 changes the optical characteristics such as the extinction coefficient and refractive index in accordance with the intensity of the light. As the material of the recording layer 3, it is possible to use an organic material such as a photopolymer, photorefractive polymer, or photochromic dye dispersed polymer, or an inorganic material such as lithium niobate or barium titanate.

The light-shielding layer 4a shields the recording layer 3 from ambient light such as room illumination light to prevent the optical characteristics of the recording layer 3 from changing. In other words, the light-shielding layer 4a prevents the recording layer 3 from being deteriorated when exposed to ambient light.

The light-shielding layer 4a increases the transmittance of the recording light when the intensity of the recording light is increased. Typically, the light-shielding layer 4a discolors or bleaches only when intensity of the recording light is high. As the material of the light-shielding layer 4a, it is possible to use a material obtained by dispersing a dye exhibiting saturable absorption in a transparent material.

Note that bleaching which occurs only with high-intensity light is a phenomenon caused, for example, by the following principle.

When a dye exhibiting saturable absorption is irradiated with light having a predetermined wavelength, each dye molecule absorbs a photon, and an electron is excited from the ground state to the excited state having a long life. Some dye molecules further absorb photons, so electrons are excited to a higher energy level. After that, chemical bonds in these molecules are broken, and no more photons are absorbed any longer. That is, a phenomenon called bleaching occurs.

As described above, bleaching used herein is a phenomenon which occurs when the dye molecules in the excited state further absorb light. Also, the number of photons per unit area is proportional to the light intensity. Therefore, the light-shielding layer 4a which contains a dye exhibiting saturable absorption is characterized in that the transmittance is low when the optical intensity is lower than a certain threshold, but abruptly increases when the light intensity exceeds the threshold.

As the dye exhibiting saturable absorption, a cyanine-based dye is well-known. Examples of the cyanine-based dye exhibiting saturable absorption are 3,3'-diethyloxacarbocyanine iodide (DOCI), 3,3'-diethyloxadicarbocyanine iodide (DODCI), 3,3'-dimethyl-9-ethylthiacarbocyanine iodide (DMETCI), 1,3'-diethyl-4,2'-quinolyloxacarbocyanine iodide (DQOCI), 1,1'-diethyl-2,2'-carbocyanine iodide (DCI-2), 3,3'-diethylthiacarbocyanine iodide (DTCI), 1,3'-diethyl-4,2'-quinolylthiacarbocyanine iodide (DQTCI), 3-diethylthiadicarbocyanine iodide (DTDCI), 1,1',3,3,3',3'-hexamethylindodicarbocyanine iodide (HIDCI), 1,1'-diethyl-4,4'-carbocyanine iodide (cryptocyanine), 1,1'-diethyl-2,2'-dicarbocyanine iodide (DDI), and 1,1',3,3,3',3'-hexamethyl-4,4',5,5'-dibenzo-2,2'-indotricarbocyanine iodide (HDITCI).

Other examples of the dye exhibiting saturable absorption are 2-(p-dimethylaminostyryl)-pyridylmethyl iodide (DASPI), Malachite Green, IR26, and IR5.

The transparent material used as the light-shielding layer 4a can be any material as long as the material transmits recording light and servo light. From the viewpoints of the dispersibility of the dye and coating property, it is advantageous to use, as this transparent material, an organic polymer such as polycarbonate, polystyrene, polymethylmethacrylate (PMMA), or polyvinyl alcohol, or inorganic glass produced by a sol-gel method.

The protective layer 5 is unnecessary in a certain use environment of the optical recording medium 1. The protective layer 5 may also be positioned between the recording layer 3 and light-shielding layer 4a. As the material of the protective layer 5, it is possible to use the same transparent material as generally used in optical recording media. An example is a transparent resin.

As the material of the reflecting layer 6, a material, e.g., aluminum, having a high reflectance to recording light can be used.

In this embodiment as described above, the holographic recording medium 1 has the structure in which the recording layer 3 is sandwiched between the light-shielding layer 4a and reflecting layer 6. Therefore, even when the optical recording medium 1 is exposed to ambient light, e.g., room illumination light, having a relatively low intensity, the optical characteristics of the recording layer 3 hardly change. Consequently, this embodiment can realize a long shelf life without any cartridge.

Also, as described previously, the light-shielding layer 4a increases the transmittance to recording light as the intensity of the recording light is increased. Accordingly, if the recording power is increased, the same recording as when the light-shielding layer 4a is not provided can be performed.

In this embodiment, the light-shielding layer 4a desirably exhibits saturable absorption with respect to recording light. If the optical intensity is much lower than the threshold, the transmittance of the light-shielding layer 4a remains substantially constant regardless of the optical intensity. Therefore, it is possible to very effectively suppress a change in optical characteristics of the recording layer 3 caused when the optical recording medium 1 is exposed to ambient light. Furthermore, if the optical intensity is much higher than the threshold, the transmittance of the light-shielding layer 4a remains substantially constant regardless of the optical intensity. Accordingly, by appropriately setting the materials of the recording layer 3 and light-shielding layer 4a, the magnitude of an optical characteristic change produced in the recording layer 3 can be made substantially proportional to the difference between the recording light intensity and threshold.

The second embodiment of the present invention will be described below.

Figure 2:
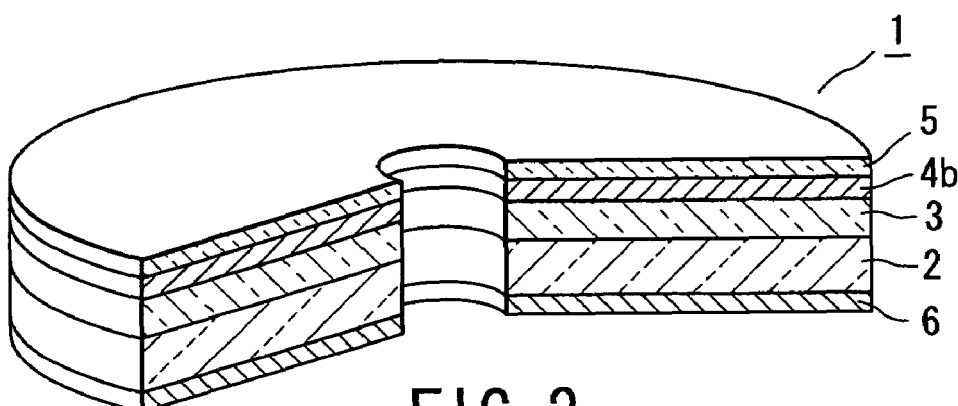
FIG. 2 is a partially cutaway perspective view schematically showing a holographic recording medium according to the second embodiment of the present invention.

FIG. 2 is a partially cutaway perspective view schematically showing a holographic recording medium according to the second embodiment of the present invention. An optical recording medium 1 according to the second embodiment has the same structure as the optical recording medium 1 according to the first embodiment except that a light-shielding layer 4b which selectively transmits recording light is used instead of the light-shielding layer 4a.

Similarly to the light-shielding layer 4a, the light-shielding layer 4b shields the recording layer 3 from ambient light such as room illumination light to prevent the optical characteristics of the recording layer 3 from changing. In other words, The light-shielding layer 4b prevents the recording layer 3 from being deteriorated when exposed to ambient light.

More particularly, of ambient light such as room illumination light, the light-shielding layer 4b selectively transmits light components within a relative narrow wavelength range including recording light, and absorbs and/or reflects most of other light components. That is, when the optical recording medium 1 is exposed to ambient light such as room illumination light having a relatively low intensity, light components reaching a recording layer 3 can be greatly reduced. Therefore, even when the optical recording medium 1 according to this embodiment is exposed to ambient light such as room illumination light having a relatively low intensity, the optical characteristics of the recording layer 3 hardly change. Accordingly, this embodiment can realize a long shelf life without any cartridge.

Also, the transmittance of the light-shielding layer 4b to light components within a relatively narrow wavelength range including recording light is higher than that to light components within other wavelength ranges. Therefore, unlike the first embodiment, the same recording as when the light-shielding layer 4b is not provided can be performed without raising the recording power.

The material and structure of the light-shielding layer 4b are not particularly limited, provided that the above function is achieved. Typical examples are an absorption type light-shielding layer and reflection type light-shielding layer explained below.

Of ambient light such as room illumination light, the absorption type light-shielding layer 4b selectively transmits light components within a relatively narrow wavelength range including recording light, and absorbs most of other light components. An example of the material of the absorption type light-shielding layer 4b is a material prepared by adding at least one type of a component selected from a dye, metal particles, and semiconductor particles to a transparent material.

If a material prepared by adding a dye to a transparent material is to be used as the material of the absorption type light-shielding layer 4b, only one type of a dye may be used. To obtain desired optical characteristics, however, it is advantageous to use a plurality of types of dyes. That is, if a dye which efficiently absorbs light components having wavelengths shorter than that of recording light is combined with a dye which efficiently absorbs light components having wavelengths longer than that of the recording light, the selectivity described previously can be easily imparted to the light-shielding layer 4b. This combination can be realized either by a single-layered structure or a multilayered structure. That is, when a plurality of types of dyes are to be combined, it is possible to form a layer by adding a mixture of these dyes to a transparent material, or stack a layer containing a transparent material and a certain dye added therein and a layer containing a transparent material and another dye added therein. Examples of dyes usable in the above combination when the wavelength of recording light is 532 nm are as follows.

When the wavelength of recording light is about 532 nm, examples of the dye which efficiently absorbs light components having wavelengths shorter than 532 nm are 2,3,5,6-1H,4H-tetrahydro-9-(3-pyridyl)-quinolizino-[9,9a,1-gh] coumarin (Coumarin 510), 2,3,5,6-1H,4H-tetrahydro-9-acetylquinolizino-[9,9a,1-gh]coumarin (Coumarin 334), N-methyl-4-trifluoromethylpiperidino-[3,2-g]coumarin (Coumarin 522), 3-(2'-benzimidazolyl)-7-N,N-diethylaminocoumarin (Coumarin 7), 3-(2'-benzothiazolyl)-7-diethylaminocoumarin (Coumarin 6), 2,3,5,6-1H,4H-tetrahydro-8-trifluoromethylquinolizino-[9,9a,1-gh]coumarin (Coumarin 153), Brilliantsulfaflavin, 3,3'-diethylthiacarbocyanine iodide (DTCI), uranine, and Fluorol 7GA.

Examples of the dye which efficiently absorbs light components having wavelengths longer than 532 nm are 1,1'-diethyl-4,4'-carbocyanine iodide (cryptocyanine), 1,1'-diethyl-2,2'-dicarbocyanine iodide (DDI), 1,1',3,3',3'-hexamethylindotricarbocyanine iodide (HITCI), IR 125, 3,3'-diethylthiatricarbocyanine iodide (DTTCI), 1,1',3,3,3', 3'-hexamethyl-4,4',5,5'-dibenzo-2,2'-indotricarbocyanine iodide (HDITCI), 3,3'-diethyl-4,4',5,5'-dibenzothiatricarbocyanine iodide (DDTTCI), and 1,2'-diethyl-4,4'-dicarbocyanine iodide (DDCI-4).

When a material prepared by adding metal particles to a transparent material is to be used as the material of the absorption type light-shielding layer 4b, examples of the metal particles are Au particles, Ag particles, and Cu particles. The absorption type light-shielding layer 4b having a desired absorption wavelength range and transmission wavelength range can be obtained by appropriately setting the type and particle size of metal particles to be used.

When a material formed by adding semiconductor particles to a transparent material is to be used as the material of the absorption type light-shielding layer 4b, examples of the semiconductor particles are CdS particles, CdSe particles, CdSSe particles, GaAs particles, a-Si particles, CdTe particles, ZnO particles, ZnS particles, ZnSe particles, ZnTe particles, GaP particles, GaN particles, AlAs particles, AlP particles, and a-SiC particles. The absorption type light-shielding layer 4b having a desired absorption wavelength range and transmission wavelength range can be obtained by appropriately setting the type and particle size of semiconductor particles to be used.

The transparent material used in the absorption type light-shielding layer 4b can be any material as long as the material transmits recording light and servo light. From the viewpoints of the dispersibility and coating properties, however, it is advantageous to use an organic polymer such as polycarbonate, polystyrene, polymethylmethacrylate (PMMA), or polyvinyl alcohol, or inorganic glass prepared by a sol-gel method.

Of ambient light such as room illumination light, the reflection type light-shielding layer 4b selectively transmits light components within a relatively narrow wavelength range including recording light, and reflects most of other light components. The reflection type light-shielding layer 4b having this characteristic can be obtained by employing, e.g., the following structure.

Figure 3:
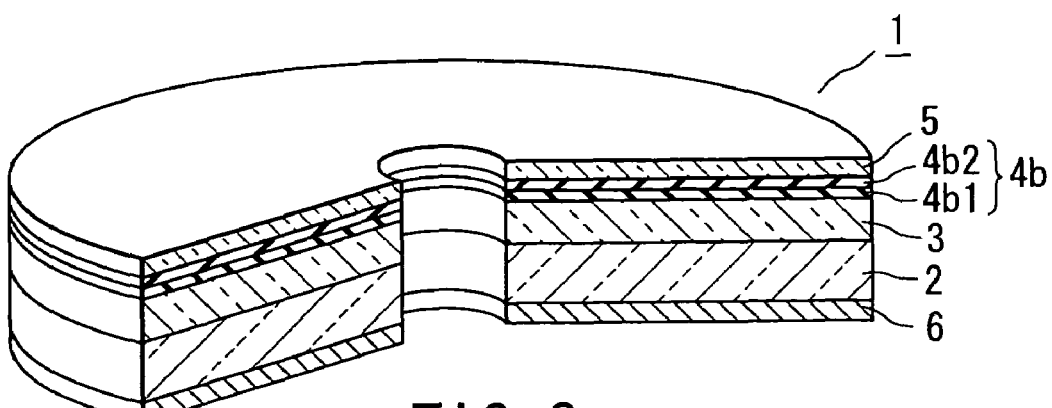
FIG. 3 is a partially cutaway perspective view schematically showing an example of a structure usable when a light-shielding layer is a reflecting layer in the optical recording medium shown in FIG. 2.

FIG. 3 is a partially cutaway perspective view schematically showing an example of a structure usable when the light-shielding layer 4b is a reflection type layer in the optical recording medium 1 shown in FIG. 2. In the optical recording medium 1 shown in FIG. 3, the light-shielding layer 4b includes a laminate of a plurality of dielectric layers made of different materials. In this example, two kinds of dielectric layers $4b_1$ and $4b_2$ are stacked.

When this structure is used, by appropriately setting the materials of the dielectric layers $4b_1$ and $4b_2$ and the thickness and number of the dielectric layers $4b_1$ and $4b_2$, it is possible to allow the light-shielding layer 4b to selectively transmit light components within a relatively narrow wavelength range including recording light, and reflect most of other light components. More specifically, when an interference layer whose normal wavelength is 1,596 nm is used as a light-shielding layer while the wavelength of recording light is about 532 nm and that of servo light is about 798 nm, it is possible to selectively transmit light components having wavelengths of 798 nm and 532 nm that are ½ and ⅓ the normal wavelength, respectively. Letting H denote a layer $4b_1$ having a high refractive index and L denote a layer $4b_2$ having a low refractive index, this interference layer whose normal wavelength is 1,596 nm is obtained by setting the optical thickness (=length÷refractive index) of each layer to 399 nm which is ¼ the normal wavelength, and forming a laminate of HLHLHLLHLHLH. Note that the portion in which two L's continue in this laminate is a layer $4b_2$ whose optical thickness is set at 798 nm which is ½ the normal wavelength, and functions as a spacer. Accordingly, the whole interference layer takes the structure of a typical interference filter which is high-reflectance multilayered film+spacer+high-reflectance multilayered film. This interference layer functions as a light-shielding layer which selectively transmits light components of 1,596 nm, 798 nm, and 532 nm.

The materials of the dielectric layers $4b_1$ and $4b_2$ can be any materials as long as the materials transmit recording light and servo light. Examples of the materials of the dielectric layers $4b_1$ and $4b_2$ are metal oxides such as $TiO_2$ and $NbO_5$, silicon-containing oxides such as $SiO_2$, metal fluorides such as calcium fluoride and magnesium fluoride, and metal sulfides such as zinc sulfide.

Compared to the absorption type light-shielding layer 4b, the reflection type light-shielding layer 4b using the laminate of the dielectric layers $4b_1$ and $4b_2$ can usually realize a narrower FWHM (Full Width at Half Maximum) and a higher maximum transmittance $T_{max}$. More specifically, the absorption type light-shielding layer 4b normally achieves an FWHM of about 50 nm or more, and the value of $T_{max}$ is about 30% or less when the FWHM is about 50 nm. In contrast, the reflection type light-shielding layer 4b can realize an FWHM of about 10 nm or less and a $T_{max}$ value of about 50% or more at the same time.

In the second embodiment, the selective transmission property of the light-shielding layer 4b can be so designed as to satisfy, e.g., the relationship represented by the following inequality:

$$T_{AVE(\lambda_{rec}-10,\lambda_{rec}+10)}/T_{AVE(300,600)} \geq 15$$

where $\lambda_{rec}$ is the wavelength of information light, and $T_{AVE(\alpha, \beta)}$ is the average transmittance calculated by using the following equation. In the following equation, $T(\lambda)$ is the transmittance of the light-shielding layer 4b to light having a wavelength $\lambda$.

$$T_{AVE(\alpha,\beta)} = \frac{\int_\alpha^\beta T(\lambda)d\lambda}{\beta - \alpha}$$

As indicated by the above inequality, if the ratio of a first average transmittance $T_{AVE(\alpha, \beta)}$ calculated by supposing $\alpha=\lambda_{rec}-10$ nm and $\beta=\lambda_{rec}+10$ nm to a second average transmittance $T_{AVE(\alpha, \beta)}$ calculated by supposing $\alpha=300$ nm and $\beta=600$ nm is 15 or more, both a long shelf life and a high transmittance to information light can be realized.

The reason for supposing $\alpha=300$ nm and $\beta=600$ nm in the second average transmittance $T_{AVE(\alpha, \beta)}$ is that, generally, the recording layer 3 is sensitive to light within the wavelength range of 300 to 600 nm but has extremely low sensitivity to light whose wavelength is shorter than 300 nm or longer than 600 nm. Since the recording layer 3 generally has very low sensitivity to light having a wavelength exceeding 600 nm as described above, it is also possible to design the light-shielding layer 4b so as to have a satisfactorily high transmittance to light having a wavelength exceeding 600 nm, and to use light having a wavelength exceeding 600 nm, e.g., red laser light, as servo light.

The optical recording media 1 according to the first and second embodiments can be mounted in a recording and reproducing apparatus described below.

Figure 4:
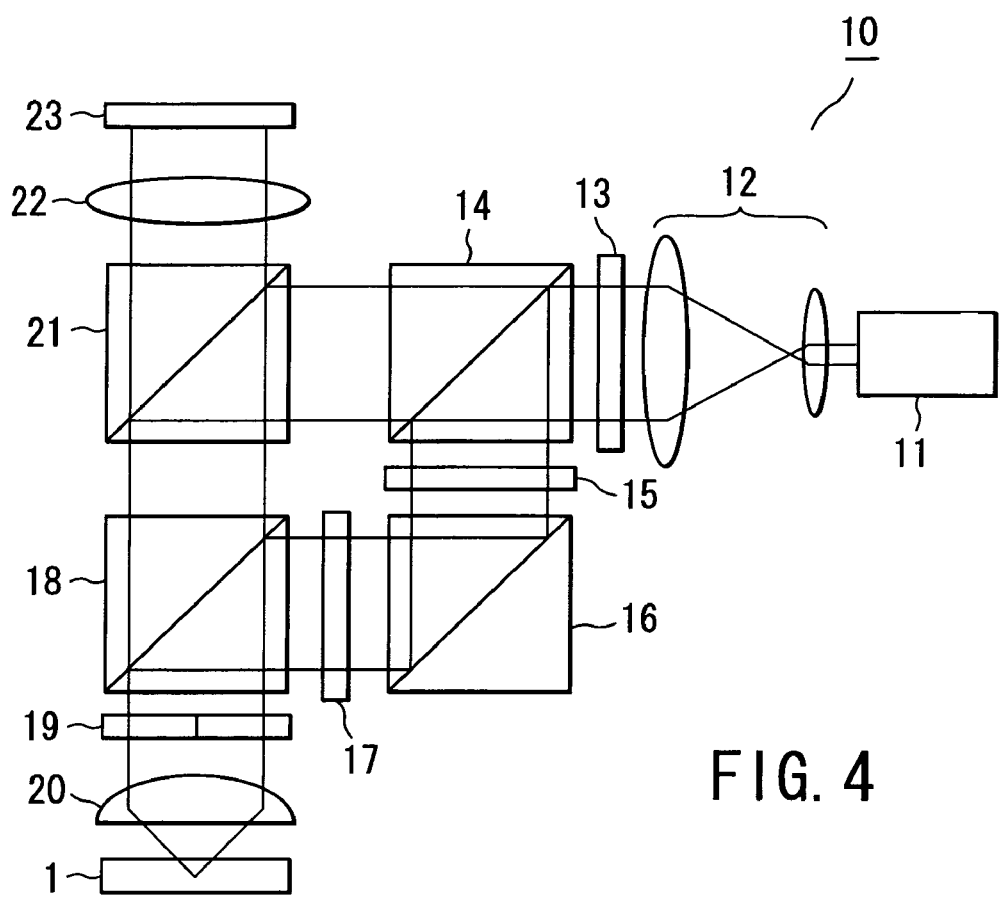
FIG. 4 is a view schematically showing an example of a holographic recording and reproducing apparatus capable of mounting the optical recording media shown in FIGS. 1 to 3.

FIG. 4 is a view schematically showing an example of a holographic recording and reproducing apparatus capable of mounting the optical recording media 1 shown in FIGS. 1 to 3. First, a recording method using a holographic recording and reproducing apparatus 10 will be explained below.

The holographic recording and reproducing apparatus 10 includes a light source 11. As the light source 11, it is desirable to use a laser which outputs coherent linearly polarized light. Examples of the laser are semiconductor laser, He—Ne laser, argon laser, and YAG laser.

A beam expander 12 increases the beam diameter of the output light beam from the light source 11. This light beam enters as a collimated beam an optical element 13 for optical rotation.

The optical element 13 for optical rotation rotates the plane of polarization of the light beam or converts the light beam into circularly polarized light or elliptically polarized light, thereby outputting a polarized light component (to be referred to as a P-polarized light component hereinafter) whose plane of polarization is parallel to the paper surface, and a polarized light component (to be referred to as an S-polarized light component hereinafter) whose plane of polarization is perpendicular to the paper surface. As the optical element 13 for optical rotation, it is possible to use, e.g., a λ/2 retardation plate or λ/4 retardation plate.

Of the output light beam from the optical element 13 for optical rotation, the S-polarized light component is reflected by a polarizing beam splitter 14 and enters a transparent spatial light modulator 15. The P-polarized light component is transmitted through the polarizing beam splitter 14. This P-polarized light component is used as reference light.

The transmission spatial light modulator 15 has a large number of pixels arranged in the form of matrix like, e.g., a transparent liquid crystal display, and can switch the P- and S-polarized light components as output light for each pixel. In this way, the transparent spatial light modulator 15 outputs information light having a two-dimensional polarization plane distribution that corresponds to information to be recorded.

The output information light from the transmission spatial optical modulator 15 then enters a polarizing beam splitter 16. Of the information light, the polarizing beam splitter 16 reflects only the S-polarized light component and transmits the P-polarized light component.

The S-polarized light component reflected by the polarizing beam splitter 16 passes through an mechanical shutter 17 and enters a polarizing beam splitter 18, as information light having a two-dimensional intensity distribution. This information light is reflected by the polarizing beam splitter 18 and enters a split optical element 19 for optical rotation.

The optical characteristic of the right side in FIG. 4 of the split optical element 19 for optical rotation is different from that of the left side. More specifically, of the information light, a light component entering the right side of the split optical element 19 for optical rotation is output with the plane of polarization being rotated by +45°, and a light component entering the left side is output with the plane of polarization being rotated by −45°. The light component obtained by rotating the plane of polarization of the S-polarized light component by +45° (or by rotating the plane of polarization of the P-polarized light component by −45°) will be referred to as an A polarized light component hereinafter. Likewise, the light component obtained by rotating the plane of polarization of the S-polarized light component by −45° (or by rotating the plane of polarization of the P-polarized light component by +45°) will be referred to as a B polarized light component hereinafter. Note that a λ/2 retardation plate, for example, can be used as each split portion of the split optical element 19 for optical rotation.

The A and B polarized light components output from the split optical element 19 for optical rotation are focused on the reflecting layer 6 of the optical recording medium 1 by an objective lens 20. Note that the protective layer 5 of the optical recording medium 1 is opposed to the objective lens 20.

A portion of the P-polarized light component (reference light) transmitted through the polarizing beam splitter 14 is reflected by a beam splitter 21 and transmitted through the polarizing beam splitter 18. The reference light transmitted through the polarizing beam splitter 18 then enters the split optical element 19 for optical rotation. A light component entering the right side is output as a B polarized light component with the plane of polarization being rotated by +45°, and a light component entering the left side is output as an A polarized light component with the plane of polarization being rotated by −45°. After that, these A and B polarized light components are focused on the reflecting layer 6 of the optical recording medium 1 by the objective lens 20.

As described above, the right side portion of the split optical element 19 for optical rotation outputs the information light as an A polarized light component and the reference light as a B polarized light component. On the other hand, the left side portion of the split optical element 19 for optical rotation outputs the information light as a B polarized light component and the reference light as an A polarized light component. The information light and reference light are focused on the reflecting layer 6 of the optical recording medium 1.

Accordingly, interference between the information light and reference light occurs only between the information light as direct light, which directly enters the recording layer 3 via the protective layer 5 and light-shielding layer 4a or 4b, and the reference light as reflected light, which is reflected by the reflecting layer 6, and between the reference light as direct light and the information light as reflected light. Also, no interference occurs between the information light as direct light and the information light as reflected light, or between the reference light as direct light and the reference light as reflected light. Therefore, the recording and reproducing apparatus 10 shown in FIG. 4 can produce an optical characteristic distribution corresponding to the information light inside the recording layer 3.

Information recorded by the above method can be read out as follows. That is, the same operation as when the information is recorded is performed except that the mechanical shutter 17 is closed. Consequently, only reference light as a P-polarized light component reaches the split optical element 19 for optical rotation.

This reference light then enters the split optical element 19 for optical rotation. A light component entering the right side is output as a B polarized light component with the plane of polarization being rotated by +45°, and a light component entering the left side is output as an A polarized light component with the plane of polarization being rotated by −45°. After that, these A and B polarized light components are focused on the reflecting layer 6 of the optical recording medium 1 by the objective lens 20.

In the recording layer 3 of the optical recording medium 1, the optical characteristic distribution corresponding to the information is formed by the above method. Therefore, portions of the A and B polarized light components entering the optical recording medium 1 are diffracted by the optical characteristic distribution formed in the recording layer 3, and output as reproduced light from the optical recording medium 1.

The A and B polarized light components as the output reproduced light from the optical recording medium 1 are converted into collimated beams by the objective lens 20, and reach the split optical element 19 for optical rotation. The B polarized light component entering the right side of the split optical element 19 for optical rotation is output as a P-polarized light component. The A polarized light component entering the left side of the split optical element 19 for optical rotation is output as a P-polarized light component. In this manner, reproduced light as a P-polarized light component is obtained.

After that, this reproduced light is transmitted through the polarizing beam splitter 18. A portion of the reproduced light transmitted through the polarizing beam splitter 18 is then transmitted through the beam splitter 21 and focused on a matrix-array photodetector 23 by an imaging lens 22. In this way, the information recorded on the optical recording medium 1 is read out.

On the other hand, the residual portions of the A and B polarized light components entering the optical recording medium 1 through the split optical element 19 for optical rotation are reflected by the reflecting layer 6 and the like and output from the optical recording medium 1. These A and B polarized light components as reflected light are converted into collimated beams by the objective lens 20. The A polarized light component enters the right side of the split optical element 19 for optical rotation and is output as an S-polarized light component. The B polarized light component enters the left side of the split optical element 19 for optical rotation and is output as an S-polarized light component. The output S-polarized light component from the split optical element 19 for optical rotation is reflected by the polarizing beam splitter 18 and hence cannot reach the matrix-array photodetector 23. Accordingly, the recording and reproducing apparatus 10 can realize a high reproduction S/N ratio.

Note that when the optical recording medium 1 according to the first embodiment is mounted in the recording and reproducing apparatus 10 described above, the transmittance of the light-shielding layer 4a can be increased during writing by using at least one of the information light and reference light, and can be increased during reading by using the reference light. However, if the optical recording medium 1 according to the first embodiment is to be mounted in the recording and reproducing apparatus 10, a light source for increasing the transmittance of the light-shielding layer 4a can also be used. In addition, the recording and reproducing apparatus 10 shown in FIG. 4 uses a collinear interference method to cause interference between the information light and reference light. However, a two-beam interference method may also be used.

The techniques according to the first and second embodiments described above can be combined. For example, it is also possible to stack the light-shielding layer 4a which increases the transmittance to recording light as the intensity of the recording light is increased, and the light-shielding layer 4b which selectively transmits the recording light. Alternatively, a dye, metal particles, or semiconductor particles can be added to the light-shielding layer 4a which increases the transmittance to recording light as the intensity of the recording light is increased. These combinations realize a longer shelf life without any cartridge.

Also, although the optical recording medium 1 is a reflection type medium in each of the first and second embodiments, the optical recording medium 1 can also be a transmission type medium. That is, the reflecting layer 6 need not be provided. When the recording medium 1 is a transmission type medium, it is desirable to form the light-shielding layer 4a and/or the light-shielding layer 4b on the both sides of the recording layer 3, in order to realize a longer shelf life without any cartridge.

Examples of the present invention will be described below.

EXAMPLE 1

<Manufacture of Optical Recording Medium>

In this example, an optical recording medium 1 shown in FIG. 1 was manufactured by the following method.

First, a recording layer 3 was formed as follows.

That is, phenanthrenequinone (PQ) and azo-bis-isobutyronitrile (AIBN) were dissolved in liquid methyl methacrylate (MMA) at a weight ratio of PQ:AIBN:MMA=0.6:0.5:98.9. Then, the viscous solution thus obtained was cast on a 0.5-mm thick square quartz glass substrate 2 of 3 cm side. 250-µm thick spacers made of a fluoroplastic were placed on the quartz glass substrate 2. After that, the quartz glass substrate 2 and a fluorine-coated quartz glass substrate were opposed to each other such that the spacers were interposed therebetween. In addition, a pressure was uniformly applied to draw the viscous solution to a thickness of 250 µm. The drawn viscous solution sandwiched between the quartz glass substrates was placed in an oven set at 45° C. and heated for 24 hrs. As a consequence, the viscous solution was turned into a recording layer 3 by promoting polymerization of MMA. The fluorine-coated quartz glass substrate and fluorine resin spacers were removed from the recording layer 3 on the quartz glass substrate 2 after cooling.

Subsequently, a light-shielding layer 4a was formed by the following method.

First, 3,3'-diethyloxadicarbocyanine iodide (DODCI) as a cyanine-based saturable absorption dye, N-methyl-4-trifluoromethylpiperidino-[3,2-g]-coumarin (Coumarin 522) as a coumarin-based dye, and polyvinyl alcohol were mixed at a weight ratio of 1:1:98. This mixture was then dissolved in ethanol so that the weight ratio of solute:solvent was 25:75, and the solution was stirred for 1 hr. The recording layer 3 described above was coated with this solution by spin coating. The resultant material was heated and dried at 45° C. for 1 hr on a heater, thereby forming a 5-µm thick light-shielding layer 4a.

After that, a reflecting layer 6 was formed by sputtering aluminum on the surface of the quartz glass substrate 2 away from the surface on which the recording layer 3 was formed.

In this example, no protective layer 5 was formed. Also, in this example, the series of operations from the start of the formation of the recording layer 3 to the completion of the formation of the reflecting layer 6 were performed in a room shielded from light having a wavelength shorter than 600 nm, so as not to expose the recording layer 3 to light.

<Evaluation of Light Shielding Layer>

While the optical recording medium 1 was manufactured by the above method, the optical characteristic of a light-shielding layer 4a separately formed by the same method as above was checked. That is, the light-shielding layer 4a was irradiated with light, and the relationship between the intensity of the irradiating light and the transmittance was checked. As a measurement light source, the second harmonic (wavelength=532 nm) of a neodymium YAG laser was used. Also, as the transmittance of the light-shielding layer 4a, the transmittance to light having a wavelength of 532 nm was measured after the light-shielding layer 4a was irradiated with light for 1 sec. The result is shown in FIG. 5.

Figure 5:
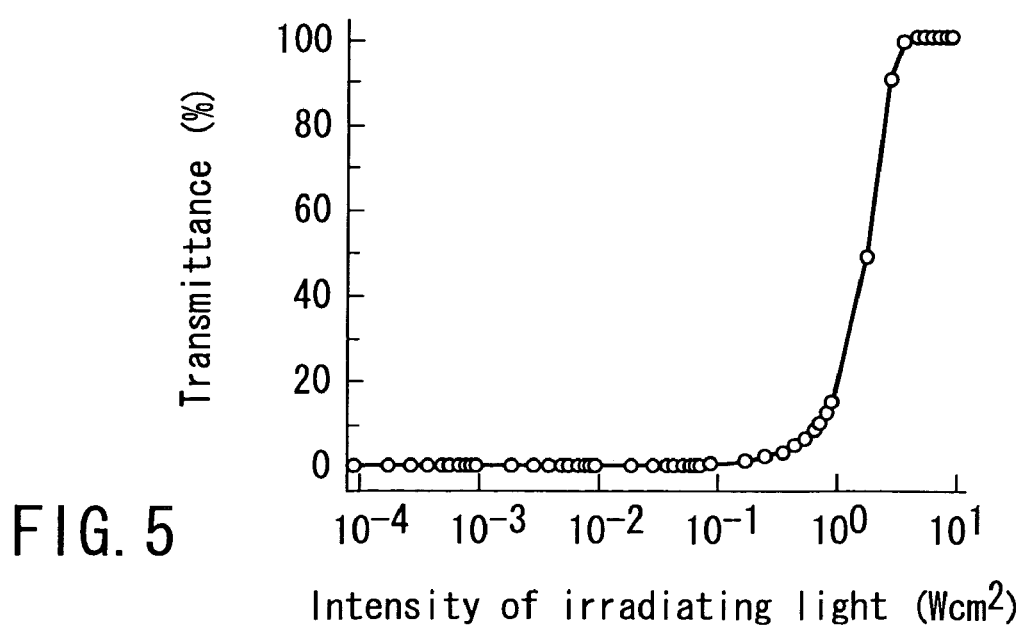
FIG. 5 is a graph showing the optical characteristic of a light-shielding layer of an optical recording medium according to Example 1.

FIG. 5 is a graph showing the optical characteristic of the light-shielding layer 4a of the optical recording medium 1 according to Example 1. In FIG. 5, the abscissa indicates the intensity of the irradiating light, and the ordinate indicates the transmittance. As shown in FIG. 5, the light-shielding layer 4a formed in this example was characterized in that when the intensity of the irradiating light was less than about 1 Wcm$^2$, the transmittance was very low, and that when the intensity of the irradiating light was about 1 Wcm$^2$ or more, the transmittance abruptly increased and then became substantially constant.

<Recording of Information>

The optical recording medium 1 manufactured by the above method was mounted in the recording and reproducing apparatus 10 shown in FIG. 4, and information was actually recorded. The second harmonic (wavelength=532 nm) of a neodymium YAG laser was used as output coherent light from the light source 11, a λ/2 retardation plate was used as the optical element 13 for optical rotation, and a liquid crystal display panel was used as the transparent spatial light modulator 15. This liquid crystal panel was disposed such that the plane of polarization of information light did not rotate. Also, the orientation of the λ/2 retardation plate used as the optical element 13 for optical rotation was so adjusted that the intensities of information light and reference light were equal on the surface of the optical recording medium 1. Furthermore, the optical intensity of each of the information light and reference light on the surface of the optical recording medium 1 was 20 mW, and the spot size of a laser beam on the upper surface of the light-shielding layer 4a was 1 mm.

<Reproduction of Information>

The information recorded on the optical recording medium 1 by the above method was read out by using the recording and reproducing apparatus 10 shown in FIG. 4. In this reading, the intensity of reference light on the surface of the optical recording medium 1 was set at 10 mW by adjusting the orientation of the λ/2 retardation plate used as the optical element 13 for optical rotation. Also, a CCD image sensor was used as the matrix-array photodetector 23.

As a consequence, information could be well written in and read out from the optical recording medium 1 before it was exposed to ambient light.

<Accelerated Test for Deterioration by Light>

The shelf life of the optical recording medium 1 was evaluated by conducting the following accelerated test for deterioration by light.

First, six optical recording media 1 manufactured by the above method were irradiated with light and thereby artificially photo-deteriorated. A 150-W Xe lamp was used as a light source, and each optical recording medium 1 was positioned at a distance of 50 cm from the lamp so as to be evenly irradiated with light. The exposure times for the six optical recording media 1 were 0, 1, 5, 10, 15, and 20 min.

Then, information was written in the optical recording media 1 under the same conditions as described above. This write operation was repeated until no increase in diffraction efficiency η was observed any longer when the information was read out under the conditions described previously. The diffraction efficiency η when the write operation was completed was regarded as a saturated diffraction efficiency. Note that the diffraction efficiency η was calculated by using the following equation:

$$\eta = \frac{Id \times R \times (1 - R)}{I}$$

where I is the intensity of light transmitted through the polarizing beam splitter 14 upon reproduction, R is the reflectance of the beam splitter 21, and Id is the intensity of diffracted light measured by the CCD image sensor 23.

Figure 6:
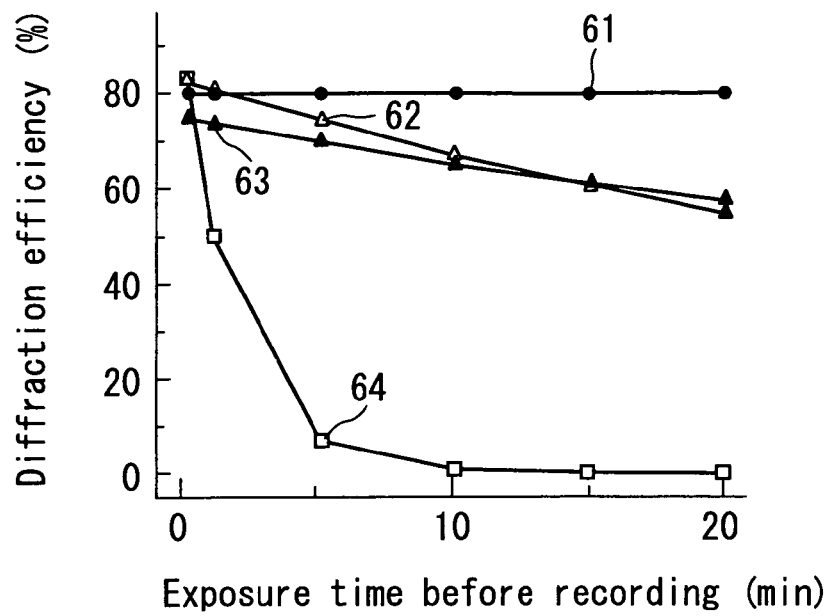
FIG. 6 is a graph showing the results of an accelerated test for deterioration by light.

FIG. 6 is a graph showing the results of the accelerated test for deterioration by light. Referring to FIG. 6, the abscissa indicates the time of exposure performed for the optical recording medium 1 before recording, and the ordinate indicates the saturated diffraction efficiency. In FIG. 6, reference numeral 61 denotes data according to this example. Also, data denoted by reference numeral 64 in FIG. 6 was obtained by an optical recording medium 1 manufactured by the same method as above except that no light-shielding layer 4a was formed, i.e., obtained by an optical recording medium according to a comparative example.

As shown in FIG. 6, the saturated diffraction efficiency of the optical recording medium 1 according to the comparative example largely lowered even though the exposure time before recording was very short. In contrast, the optical recording medium 1 according to this example showed almost no decrease in saturated diffraction efficiency even when exposed for a long time before recording. That is, the optical recording medium 1 according to this example had a long shelf life.

EXAMPLE 2

<Manufacture of Optical Information Recording Medium>

In this example, an optical recording medium 1 shown in FIG. 2 was manufactured by the following method.

First, a recording layer 3 was formed on a quartz glass substrate 2 by the same method as explained in Example 1.

Subsequently, a light-shielding layer 4b was formed by the following method.

First, N-methyl-4-trifluoromethylpiperidino[-3,2-g]-coumarin (Coumarin 522) as a coumarin-based dye, 3,3'-diethyl-4,4',5,5'-dibenzothiatricarbocyanine iodide (DDT-TCI), and polyvinyl alcohol were mixed at a weight ratio of 1:1:98. This mixture was then dissolved in ethanol so that the weight ratio of solute:solvent was 25:75, and the solution was stirred for 1 hr. The recording layer 3 described above was coated with this solution by spin coating. The resultant material was heated and dried at 45° C. for 1 hr on a heater, thereby forming a 5-μm thick light-shielding layer 4b.

After that, a reflecting layer 6 was formed by sputtering aluminum on the surface of the quartz glass substrate 2 away from the surface on which the recording layer 3 was formed.

In this example, no protective layer 5 was formed. Also, in this example, the series of operations from the start of the formation of the recording layer 3 to the completion of the formation of the reflecting layer 6 were performed in a room shielded from light having a wavelength shorter than 600 nm, so as not to expose the recording layer 3 to light.

<Evaluation of Light Shielding Layer>

While the optical recording medium 1 was manufactured by the above method, the optical characteristic of a light-shielding layer 4b separately formed by the same method as above was checked. That is, the light-shielding layer 4b was irradiated with light, and the relationship between the intensity of the irradiating light and the transmittance was checked.

Figure 7:
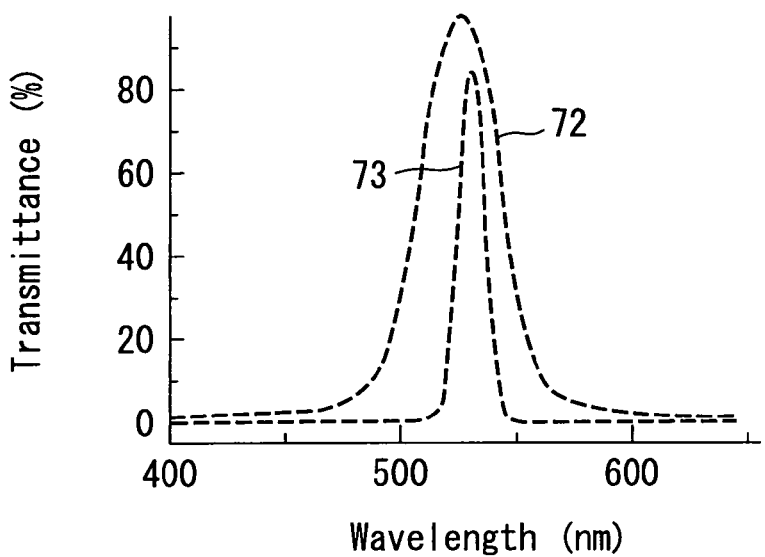
FIG. 7 is a graph showing the transmittance spectra of the light-shielding layers.

FIG. 7 is a graph showing the transmittance spectrum of the light-shielding layer 4b. Referring to FIG. 7, the abscissa indicates the wavelength of the irradiating light, and the ordinate indicates the transmittance of the light-shielding layer 4b. In FIG. 7, reference numeral 72 denotes data according to this example.

As shown in FIG. 7, the light-shielding layer 4b formed in this example had a high transmittance to light having a wavelength of about 525 nm, but had a low transmittance to light having a shorter wavelength or longer wavelength. In particular, the light-shielding layer 4b hardly transmitted light having a wavelength of 475 nm or less or light having a wavelength of 575 nm or more.

<Accelerated Test for Deterioration by Light>

The shelf life of the optical recording medium 1 was evaluated by conducting the same accelerated test for deterioration by light as explained in Example 1.

FIG. 6 shows the result. In FIG. 6, reference numeral 62 denotes data according to this embodiment.

As shown in FIG. 6, the optical recording medium 1 according to this example slightly decreased the saturated diffraction efficiency when exposed for a long time before recording. However, this decrease in saturated diffraction efficiency was much smaller than that of the optical recording medium according to the comparative example. That is, the optical recording medium 1 according to this example had a long shelf life.

EXAMPLE 3

<Manufacture of Optical Information Recording Medium>

Figure 8:
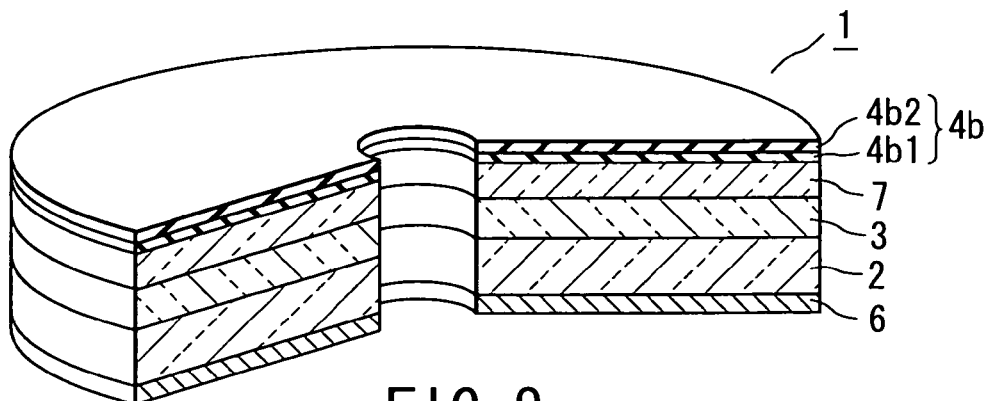
FIG. 8 is a partially cutaway perspective view schematically showing a holographic recording medium according to Example 3.

FIG. 8 is a partially cutaway perspective view schematically showing an optical recording medium according to Example 3. In this example, an optical recording medium 1 shown in FIG. 8 was manufactured by the following method.

First, a recording layer 3 was formed on a quartz glass substrate 2 by the same method as explained in Example 1. In this example, however, a quartz glass substrate 7 prepared separately from the quartz glass substrate 2 was not removed from the recording layer 3.

Subsequently, a light-shielding layer 4b was formed on the quartz glass substrate 7 by stacking 229-nm thick zinc sulfide layers $4b_1$ (to be abbreviated as H) and 386-nm thick magnesium fluoride layers $4b_2$ (to be abbreviated as L) in the order of HLHLHLLHLHLH by sputtering.

After that, a reflecting layer 6 was formed by sputtering aluminum on the surface of the quartz glass substrate.

In this example, the series of operations from the start of the formation of the recording layer 3 to the completion of the formation of the reflecting layer 6 were performed in a room shielded from light having a wavelength shorter than 600 nm, so as not to expose the recording layer 3 to light.

<Evaluation of Light Shielding Layer>

While the optical recording medium 1 was manufactured by the above method, the optical characteristic of a light-shielding layer 4b separately formed by the same method as above was checked. That is, the light-shielding layer 4b was irradiated with light, and the relationship between the intensity of the irradiating light and the transmittance was checked. The result is shown in FIG. 7. In FIG. 7, reference numeral 73 denotes data according to this example.

As shown in FIG. 7, the light-shielding layer 4b formed in this example had a high transmittance to light having a wavelength of about 530 nm, but had a low transmittance to light having a shorter wavelength or longer wavelength. In particular, the light-shielding layer 4b hardly transmitted light having a wavelength of 510 nm or less or light having a wavelength of 550 nm or more.

<Accelerated Test for Deterioration by Light>

The shelf life of the optical recording medium 1 was evaluated by conducting the same accelerated test for deterioration by light as explained in Example 1.

FIG. 6 shows the result. In FIG. 6, reference numeral 63 denotes data according to this embodiment.

As shown in FIG. 6, the optical recording medium 1 according to this example slightly decreased the saturated diffraction efficiency when exposed for a long time before recording. However, this decrease in saturated diffraction efficiency was much smaller than that of the optical recording medium according to the comparative example. That is, the optical recording medium 1 according to this example had a long shelf life.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A holographic recording medium comprising:
   a recording layer in which information is to be holographically recorded; and
   a light-shielding layer which faces a main surface of the recording layer and selectively transmits a recording light, wherein a ratio of a first average transmittance to a second average transmittance is 15 or larger, the first average transmittance being an average transmittance of the light-shielding layer within a wavelength range of $\lambda_{rec}-10$ nm to $\lambda_{rec}+10$ nm where $\lambda_{rec}$ representing a wavelength of the recording light, and the second average transmittance being an average transmittance of the light-shielding layer within a wavelength range of 300 nm to 600 nm.

2. The medium according to claim 1, wherein the light-shielding layer contains a transparent material and at least one component selected from the group consisting of a dye dissolved or dispersed in the transparent material, metal particles dispersed in the transparent material, and semiconductor particles dispersed in the transparent material.

3. The medium according to claim 1, wherein the light-shielding layer contains a transparent material and at least one component selected from the group consisting of a dye dissolved or dispersed in the transparent material, metal particles dispersed in the transparent material, and semiconductor particles dispersed in the transparent material.

4. The medium according to claim 1, wherein the light-shielding layer includes a laminate of dielectric layers, materials of the dielectric layers adjacent to each other being different from each other.

5. The medium according to claim 1, wherein the recording layer contains organic material.

6. The medium according to claim 1, wherein the recording layer contains inorganic material.

7. The medium according to claim 1, further comprising a substrate which supports the recording layer and the light-shielding layer with the recording layer interposed between the substrate and the light-shielding layer.

8. The medium according to claim 1, further comprising a reflecting layer which is disposed on a side of the recording layer opposite to the light-shielding layer.

9. The medium according to claim 8, further comprising a substrate between the recording layer and the reflecting layer.

10. A holographic recording medium comprising:
    a recording layer in which information is to be holographically recorded; and
    a light-shielding layer which faces a main surface of the recording layer and selectively transmits a recording light, wherein the light-shielding layer includes a laminate of dielectric layers, materials of the dielectric layers adjacent to each other being different from each other.

* * * * *